April 21, 1936.    G. I. EVERETT ET AL    2,037,772
EYE AND NOSE PROTECTOR
Filed Sept. 11, 1935

INVENTORS
George I. Everett
& Deane W. Colton
BY
ATTORNEY.

Patented Apr. 21, 1936

2,037,772

UNITED STATES PATENT OFFICE 2,037,772

EYE AND NOSE PROTECTOR

George Ira Everett, Jackson Heights, and Deane W. Colton, New York, N. Y.

Application September 11, 1935, Serial No. 40,132

1 Claim. (Cl. 2—12)

The purpose of this invention is to provide a protector for the nose to prevent sunburn which may be made integral with, or attached to, a pair of glasses.

The invention is a protector in the form of a shield which extends from the bridge of a pair of glasses outward over the nose to protect the nose from the sun and the device may be made integral with glasses, attached to the glasses, or used independent thereof.

Similar devices have been used, however these have been attached directly to the nose or attached to the nose and the glasses with both the device and the glasses held to the nose by spring clips and as any device that rests directly upon the nose is objectionable, with the possible exception of a spring clip similar to the clip used for nose glasses, it has been found desirable to make a detachable device that is supported from the glasses and does not engage the nose.

The object of the invention is therefore to provide a nose shield which is supported from a pair of glasses and which does not rest upon the nose.

Another object is to provide a nose shield which may or may not be used with a pair of glasses.

A further object is to provide a nose shield which is so constructed that it may readily be attached to glasses now in use.

And a still further object is to provide a combination of sun glasses with a nose shield either made integral therewith or detachable, which is of a simple and economical construction.

With these ends in view the invention embodies a pair of glasses with a shield adapted to extend outward from the front thereof and over the nose in which the shield may be made integral with the glasses or removable therefrom.

Other features and advantages of the invention will appear from the following description taken in connection with the drawing, wherein:—

Figure 1:
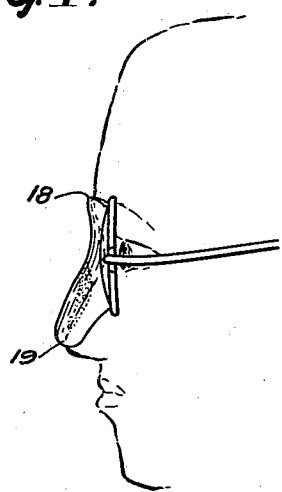
Figure 1 is a view showing a side view of the device as it would appear in use.
Figure 2:
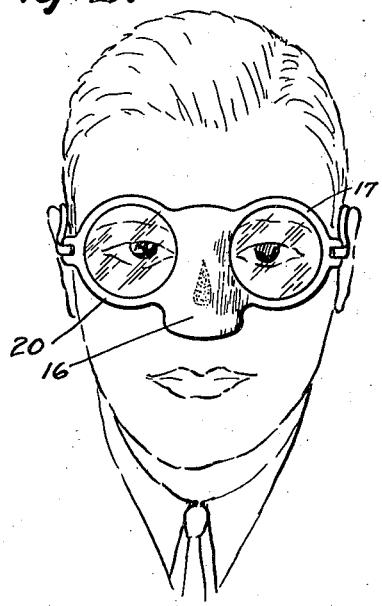
Figure 2 is a front view showing the device in use.
Figure 3:
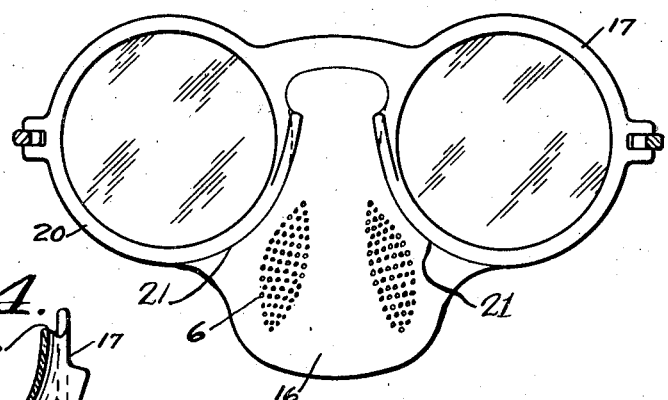
Figure 3 is a view looking toward the inside of a pair of glasses with the device made integral therewith.
Figure 4:
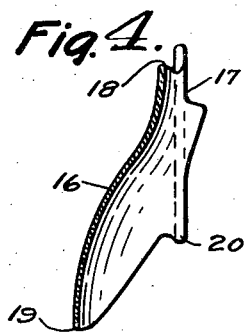
Figure 4 is a cross section through a pair of glasses showing the shape of the nose shield.

In the design shown the shield is indicated by the numeral 16 and the glasses by the numeral 17 and it will be noted that the device extends downward from the upper edge 18 of the bridge to a point 19 corresponding with the lower end of a nose, however it will be understood that the shield may be long or short or may terminate slightly above the end of the nose or slightly below the nose as may be desired. In this design the sides of the shield merge into the inner edges of the rings 20 forming the rims of the glasses as shown at the points 21 providing an integral construction, and this provides a very unique construction and an attractive design. The thickness of the material of the shield 16 may be the same as that of the bridge or relatively thin and this material may be the same as that of which the glasses are made or of a different material as may be desired. The shield may be provided with perforations 6 if desired.

Other changes may be made in the device without departing from the spirit of the invention. One of which changes may be in the use of a shield of any other design, another may be in the use of other means for attaching the shield to the glasses, and still another may be in the use of the shield in combination with glasses of any other type or design.

Having thus fully described the invention, what we claim as new and desire to secure by Letters Patent, is:—

As an article of manufacture, a pair of glasses having rims of a stiff material, a bridge made of the same material, side bars for holding the glasses from the ears, and a central member made of the same material as the rims and integral therewith, extending from the bridge outward and adapted to project over the nose without engaging the nose with the edges thereof formed into the inner edges of the rims of the glasses, said central member being substantially U shaped to correspond with the shape of the nose.

GEORGE IRA EVERETT.
DEANE W. COLTON.